UNITED STATES PATENT OFFICE.

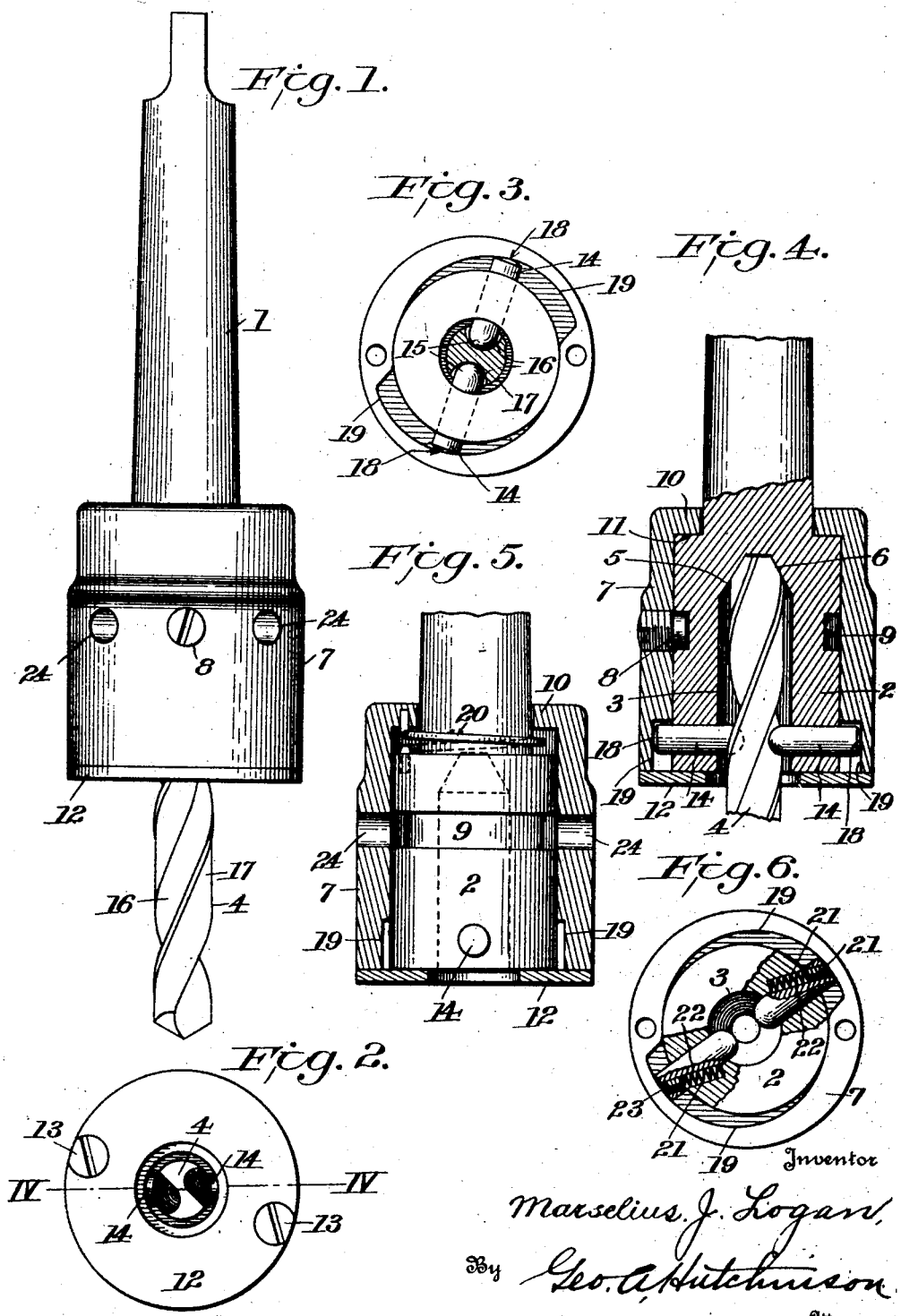

MARSELIUS J. LOGAN, OF SPRINGFIELD, VIRGINIA, ASSIGNOR, BY DIRECT AND MESNE ASSIGNMENTS, TO WAYNE TOOL MANUFACTURING COMPANY, OF WAYNESBORO, PENNSYLVANIA, A CORPORATION OF PENNSYLVANIA.

DRILL-CHUCK.

1,376,384.     Specification of Letters Patent.     Patented Apr. 26, 1921.

Application filed February 14, 1920. Serial No. 358,787.

*To all whom it may concern:*

Be it known that I, MARSELIUS J. LOGAN, a subject of the King of Norway, residing at Springfield, in the county of Fairfax and State of Virginia, have invented certain new and useful Improvements in Drill-Chucks, of which the following is a full, clear, and exact specification.

This invention relates to drill chucks, and has for its object to provide a chuck adapted to hold and operate drills and reamers that are broken off below the shanks, thus making it possible to utilize such broken drills and reamers many of which are now thrown away every day.

It is the aim of this invention to provide a chuck of simple and sturdy construction having means for centering a broken drill therein, and means for clamping or gripping said drill firmly between its flutes. Means may also be provided for automatically closing said gripping means upon the drill, and means acting to withdraw said gripping devices when the chuck is manually operated to release them.

The invention will be first hereinafter described in connection with the accompanying drawings, which constitute part of this specification, and then more specifically defined in the claim at the end of the description.

In the accompanying drawings, wherein similar reference characters are used to designate corresponding parts throughout the several views:—

Figure 1 is an elevation of a chuck made substantially in accordance with this invention, showing a broken drill arranged therein.

Fig. 2 is a lower end view of the device as shown in Fig. 1.

Fig. 3 is a lower end view of the chuck with the bottom plate removed to show the cam-shaped recesses for actuating the clamping pins.

Fig. 4 is a broken section on the line IV—IV of Fig. 2.

Fig. 5 is a broken elevation of a modified form of chuck with the cam sleeve shown in section and a spring illustrated for automatically rotating said sleeve in a direction for advancing the clamping pins into engagement with the drill, and Fig. 6 is a broken end view of a further modification showing means for automatically withdrawing the clamping pins from contact with the drill when the cam sleeve is rotated in a direction to release them.

As illustrated in Figs. 1, 2, 3 and 4, the chuck consists of a shank 1 having a generally cylindrical lower end portion 2 provided with a central bore or socket 3 to receive either the shank of an unbroken drill or the fluted portion 4 of a broken drill. The upper end of said socket 3 is tapered at 5 to center the upper end of the broken drill 4 which is preferably ground off generally conical, as at 6, for that purpose.

A sleeve or collar 7 is fitted to rotate upon the cylindrical portion 2 of the shank of the chuck, and may be retained in proper alinement therewith by means of a pin or lug 8 projecting from said sleeve into an annular groove 9 in the part 2. The sleeve may be further held against axial movement of the shank by means of a flange 10 on the upper end of said sleeve engaging a ledge 11 on the shank at the upper end of the cylindrical portion 2, and by means of a bottom plate 12 secured to the lower end of the sleeve in any suitable manner, as by screws 13, and overlapping the lower end of the cylindrical portion 2 of the shank.

Drill gripping pins 14 are mounted to slide radially in the lower end portion of the socketed part 2 of the chuck at diametrically opposite points thereof. The inner ends of said pins 14 are rounded at 15 to fit in the grooves 16 between the flutes 17 of the drill 4. The outer ends of said pins may also be slightly rounded at 18 to engage with as little friction as possible cam-shaped recesses 19 in the lower end of the sleeve 7, as clearly shown in Figs. 3 and 4. It will be seen that by rotating the sleeve clockwise in Fig. 3 the clamping pins will be pressed into engagement with the grooves of the drill, while by rotating said sleeve anti-clockwise said pins will be released from the drill.

As illustrated in Fig. 5, a spring 20 may be interposed between the flange 10 and the ledge 11, which in this instance is spaced from said flange to provide space to house said spring, for automatically rotating the sleeve in the proper direction for advancing the pins 14 into engagement with the drill. The pins themselves may also be provided with springs 21, Fig. 6, for automatically withdrawing them when released by the cam sleeve 7. Said springs 21 are arranged in oblique bores 22 formed in the pins and the walls of the bores in the shank in which they are fitted, and are retained in place by screw plugs 23 which are adjustable in the bores or sockets for tensioning the springs.

In using the chuck with the springs, as shown in Figs. 5 and 6, the sleeve 7 is rotated manually against the action of the spring 20 for releasing a drill, and when the pins 14 are thus released from inward pressure by the walls of the cam recesses 19 the springs 21 immediately move said pins outward away from the drill. After the drills have been changed the sleeve is released and the spring 20, being stronger than the springs 21, will advance the pins 14 at once into engagement with the drill. Sockets 24 are provided in the sleeve for further tightening the grip of the pins on the drill by means of a spanner wrench (not shown) if necessary.

The clamping pins 14 are preferably made cylindrical, as shown, in order to engage in the grooves of a twist drill between its flutes without injuring the latter, where clamping members or jaws of greater axial extent would not be practical. The rounded inner ends 15 of said pins also contribute to the successful gripping of the twist drill without marring its flutes.

Having thus described my invention, what I claim as new and desire to secure by Letters Patent of the United States is:—

A chuck, for broken drills, having a shank provided with an enlarged cylindrical head forming an annular shoulder at its juncture with the shank, there being an axial socket in said head to receive a drill, said socket having its inner end tapered to center a broken drill therein, a rotary collar fitted around said cylindrical head to bear thereon, a flange on said collar to engage said annular shoulder of the head to prevent outward axial movement of the collar on said head, clamping members mounted to slide radially in the head and adapted to engage in the flutes of a broken drill, said collar also having cam ways for actuating the clamping members, said cam ways opening on the outer end of the collar, a plate secured to said outer end of the collar and overlapping the outer end of the head for preventing inward axial movement of the collar on said head, there being a bore reaching from the outer end of each clamping member obliquely therethrough and into the head, springs in said bores for automatically retracting the clamping members when the latter are released from the pressure of the cam ways, and adjustable plugs in the outer ends of said bores for tensioning said springs.

In testimony whereof I have signed my name to this specification.

MARSELIUS J. LOGAN.